(12) United States Patent
Nguyen et al.

(10) Patent No.: US 7,350,571 B2
(45) Date of Patent: *Apr. 1, 2008

(54) METHODS OF PREPARING AND USING COATED PARTICULATES

(75) Inventors: Philip D. Nguyen, Duncan, OK (US); Jimmie D. Weaver, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 121 days.

This patent is subject to a terminal disclaimer.

(21) Appl. No.: 11/370,119

(22) Filed: Mar. 7, 2006

(65) Prior Publication Data

US 2006/0151168 A1 Jul. 13, 2006

Related U.S. Application Data

(62) Division of application No. 10/794,076, filed on Mar. 5, 2004, now Pat. No. 7,063,151.

(51) Int. Cl.
*E21B 43/04* (2006.01)

(52) U.S. Cl. .................. 166/276; 166/278; 166/295; 427/221; 428/407; 507/219; 507/901; 507/904; 523/131

(58) Field of Classification Search .............. 166/276, 166/278, 295, 300; 428/407; 507/117, 219, 507/901, 904, 924; 523/130, 131, 132
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,336,980 A | 8/1967 | Rike | 166/295 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,659,651 A | 5/1972 | Graham | 166/280 |
| 3,681,287 A | 8/1972 | Brown et al. | 260/67 |
| 3,708,013 A | 1/1973 | Dismuke | 166/276 |
| 3,709,298 A | 1/1973 | Pramann | 166/276 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,015,995 A | 4/1977 | Hess | 106/287 |
| 4,029,148 A | 6/1977 | Emery | 166/250.1 |
| 4,031,958 A | 6/1977 | Sandiford et al. | 166/270 |
| 4,042,032 A | 8/1977 | Anderson | 166/276 |
| 4,070,865 A | 1/1978 | McLaughlin | 61/36 |
| 4,074,760 A | 2/1978 | Copeland et al. | 166/276 |
| 4,085,801 A | 4/1978 | Sifferman | 166/295 |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |

(Continued)

FOREIGN PATENT DOCUMENTS

CA 2063877 5/2003

(Continued)

OTHER PUBLICATIONS

U.S. Appl. No. 10/603,492, filed Jun. 25, 2003, Nguyen et al.

(Continued)

*Primary Examiner*—George Suchfield
(74) *Attorney, Agent, or Firm*—Robert A. Kent; Baker Botts, L.L.P.

(57) ABSTRACT

The present invention involves methods of preparing coated particulates and using such coated particulates in subterranean applications such as production enhancement and sand control. One embodiment of the present invention provides a method of preparing coated particulates comprising the steps of coating particulates with a resin or a tackifying agent to create pre-coated particulates; and, covering the pre-coated particulates with a partitioning agent to create coated particulates. Another embodiment of the present invention provides a method of treating a subterranean formation comprising the steps of providing coated particulates made by a method comprising the steps of substantially coating particulates with a resin or a tackifying agent to create pre-coated particulates; and, substantially covering the pre-coated particulates with a partitioning agent to create coated particulates; substantially slurrying the coated particulates in a servicing fluid to create a coated particulate slurry; and, placing the coated particulate slurry into the subterranean formation.

20 Claims, No Drawings

U.S. PATENT DOCUMENTS

| | | | |
|---|---|---|---|
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstoesser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A * | 4/1986 | Graham et al. | 166/280.2 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,670,501 A | 6/1987 | Dymond et al. | 524/458 |
| 4,675,140 A | 6/1987 | Sparks et al. | 264/4.3 |
| 4,681,165 A | 7/1987 | Bannister | 166/312 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,772,646 A | 9/1988 | Harms et al. | 524/27 |
| 4,777,200 A | 10/1988 | Dymond et al. | 524/458 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A * | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,095,987 A | 3/1992 | Weaver et al. | 166/276 |
| 5,105,886 A | 4/1992 | Strubhar | 166/280 |
| 5,107,928 A | 4/1992 | Hilterhaus | 166/293 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Facteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Csabai et al. | 521/63 |
| 5,232,961 A | 8/1993 | Murphey et al. | 523/414 |
| 5,238,068 A | 8/1993 | Fredrickson | 166/307 |
| 5,247,059 A | 9/1993 | Gruber et al. | 528/354 |
| 5,249,627 A | 10/1993 | Harms et al. | 166/308 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,278,203 A | 1/1994 | Harms | 523/200 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrigues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,494,178 A | 2/1996 | Nguyen et al. | 166/276 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,274 A | 3/1996 | Nguyen et al. | 166/276 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |

| | | | |
|---|---|---|---|
| 5,582,249 A | 12/1996 | Caveny et al. ............... 166/276 |
| 5,582,250 A | 12/1996 | Constien .................... 166/280 |
| 5,588,488 A | 12/1996 | Vijn et al. .................. 166/293 |
| 5,591,700 A | 1/1997 | Harris et al. ................ 507/204 |
| 5,594,095 A | 1/1997 | Gruber et al. ............... 528/354 |
| 5,595,245 A | 1/1997 | Scott, III ................. 166/250.1 |
| 5,597,784 A | 1/1997 | Sinclair et al. ............. 507/219 |
| 5,604,184 A | 2/1997 | Ellis et al. .................. 507/117 |
| 5,604,186 A | 2/1997 | Hunt et al. .................. 507/204 |
| 5,609,207 A | 3/1997 | Dewprashad et al. ........ 166/276 |
| 5,620,049 A | 4/1997 | Gipson et al. ............... 166/248 |
| 5,639,806 A | 6/1997 | Johnson et al. ............. 523/208 |
| 5,670,473 A | 9/1997 | Scepanski ................... 510/445 |
| 5,692,566 A | 12/1997 | Surles ........................ 166/295 |
| 5,697,440 A | 12/1997 | Weaver et al. .............. 166/281 |
| 5,698,322 A | 12/1997 | Tsai et al. ................... 428/373 |
| 5,712,314 A | 1/1998 | Surles et al. ................. 521/41 |
| 5,732,364 A | 3/1998 | Kalb et al. ...................... 588/8 |
| 5,765,642 A | 6/1998 | Surjaatmadja ............... 166/297 |
| 5,775,425 A | 7/1998 | Weaver et al. .............. 166/276 |
| 5,782,300 A | 7/1998 | James et al. ................ 166/278 |
| 5,783,822 A | 7/1998 | Buchanan et al. ........... 250/259 |
| 5,787,986 A | 8/1998 | Weaver et al. |
| 5,791,415 A | 8/1998 | Nguyen et al. .............. 166/280 |
| 5,799,734 A | 9/1998 | Norman et al. .............. 166/278 |
| 5,806,593 A | 9/1998 | Suries ........................ 166/270 |
| 5,830,987 A | 11/1998 | Smith ......................... 528/332 |
| 5,833,000 A | 11/1998 | Weaver et al. .............. 166/276 |
| 5,833,361 A | 11/1998 | Funk ............................ 366/80 |
| 5,836,391 A | 11/1998 | Jonasson et al. ............ 166/295 |
| 5,836,392 A | 11/1998 | Urlwin-Smith .............. 166/295 |
| 5,837,656 A * | 11/1998 | Sinclair et al. .............. 507/220 |
| 5,837,785 A | 11/1998 | Kinsho et al. ............... 525/527 |
| 5,839,510 A | 11/1998 | Weaver et al. .............. 166/276 |
| 5,840,784 A | 11/1998 | Funkhouser et al. ........ 523/130 |
| 5,849,401 A | 12/1998 | El-Afandi et al. ........... 428/215 |
| 5,849,590 A | 12/1998 | Anderson, II et al. ........ 436/27 |
| 5,853,048 A | 12/1998 | Weaver et al. .............. 166/279 |
| 5,864,003 A | 1/1999 | Qureshi et al. .............. 528/141 |
| 5,865,936 A | 2/1999 | Edelman et al. ............. 156/310 |
| 5,871,049 A | 2/1999 | Weaver et al. .............. 166/276 |
| 5,873,413 A | 2/1999 | Chatterji et al. ............. 166/293 |
| 5,875,844 A | 3/1999 | Chatterji et al. ............. 166/293 |
| 5,875,845 A | 3/1999 | Chatterji et al. ............. 166/293 |
| 5,875,846 A | 3/1999 | Chatterji et al. ............. 166/293 |
| 5,893,383 A | 4/1999 | Facteau ........................ 137/14 |
| 5,893,416 A | 4/1999 | Read ........................... 166/304 |
| 5,908,073 A | 6/1999 | Nguyen et al. .............. 166/276 |
| 5,911,282 A | 6/1999 | Onan et al. .................... 175/72 |
| 5,916,933 A | 6/1999 | Johnson et al. ............. 523/208 |
| 5,921,317 A | 7/1999 | Dewprashad et al. ........ 166/208 |
| 5,924,488 A | 7/1999 | Nguyen et al. .............. 166/280 |
| 5,929,437 A | 7/1999 | Elliott et al. ................ 250/259 |
| 5,944,105 A | 8/1999 | Nguyen ...................... 166/278 |
| 5,945,387 A | 8/1999 | Chatterji et al. ............. 507/224 |
| 5,948,734 A | 9/1999 | Sinclair et al. .............. 507/219 |
| 5,957,204 A | 9/1999 | Chatterji et al. ............. 166/295 |
| 5,960,877 A | 10/1999 | Funkhouser ................ 166/270 |
| 5,960,878 A | 10/1999 | Nguyen et al. .............. 166/276 |
| 5,960,880 A | 10/1999 | Nguyen et al. .............. 166/280 |
| 5,964,291 A | 10/1999 | Bourne et al. ............... 166/279 |
| 5,969,006 A | 10/1999 | Onan et al. .................. 523/166 |
| 5,977,283 A | 11/1999 | Rossitto ........................ 528/44 |
| 5,994,785 A | 11/1999 | Higuchi et al. .............. 527/789 |
| RE36,466 E | 12/1999 | Nelson et al. ............... 166/280 |
| 6,003,600 A | 12/1999 | Nguyen et al. .............. 166/281 |
| 6,004,400 A | 12/1999 | Bishop et al. ................... 134/2 |
| 6,006,835 A | 12/1999 | Onan et al. .................. 166/295 |
| 6,006,836 A | 12/1999 | Chatterji et al. ............. 166/295 |
| 6,012,524 A | 1/2000 | Chatterji et al. ............. 166/295 |
| 6,016,870 A | 1/2000 | Dewprashad et al. ........ 166/295 |
| 6,024,170 A | 2/2000 | McCabe et al. ............. 166/300 |
| 6,028,113 A | 2/2000 | Scepanski ................... 514/643 |
| 6,028,534 A | 2/2000 | Ciglenec et al. ......... 340/856.2 |
| 6,040,398 A | 3/2000 | Kinsho et al. ............... 525/527 |
| 6,047,772 A | 4/2000 | Weaver et al. .............. 166/276 |
| 6,059,034 A | 5/2000 | Rickards et al. ............. 166/280 |
| 6,059,035 A | 5/2000 | Chatterji et al. ............. 166/293 |
| 6,059,036 A | 5/2000 | Chatterji et al. ............. 166/294 |
| 6,068,055 A | 5/2000 | Chatterji et al. ............. 168/293 |
| 6,069,117 A | 5/2000 | Onan et al. .................. 507/202 |
| 6,074,739 A | 6/2000 | Katagiri ...................... 428/323 |
| 6,079,492 A | 6/2000 | Hoogteijling et al. ........ 166/276 |
| 6,098,711 A | 8/2000 | Chatterji et al. ............. 166/294 |
| 6,114,410 A | 9/2000 | Betzold ....................... 523/130 |
| 6,123,871 A | 9/2000 | Carroll ..................... 252/301.36 |
| 6,123,965 A | 9/2000 | Jacon et al. ................. 424/489 |
| 6,124,246 A | 9/2000 | Heathman et al. .......... 507/219 |
| 6,130,286 A | 10/2000 | Thomas et al. .............. 524/507 |
| 6,135,987 A | 10/2000 | Tsai et al. ................... 604/365 |
| 6,140,446 A | 10/2000 | Fujiki et al. ................... 528/15 |
| 6,148,911 A | 11/2000 | Gipson et al. ............... 166/248 |
| 6,152,234 A | 11/2000 | Newhouse et al. .......... 166/403 |
| 6,162,766 A | 12/2000 | Muir et al. .................. 507/267 |
| 6,169,058 B1 | 1/2001 | Le et al. ...................... 507/222 |
| 6,172,011 B1 | 1/2001 | Card et al. ................... 507/204 |
| 6,172,077 B1 | 1/2001 | Curtis et al. ................. 514/278 |
| 6,176,315 B1 | 1/2001 | Reddy et al. ................ 166/295 |
| 6,177,484 B1 | 1/2001 | Surles ......................... 523/131 |
| 6,184,311 B1 | 2/2001 | O'Keffe et al. .............. 525/438 |
| 6,187,834 B1 | 2/2001 | Thayer et al. ................. 522/15 |
| 6,187,839 B1 | 2/2001 | Eoff ............................ 523/130 |
| 6,189,615 B1 | 2/2001 | Sydansk ...................... 166/270 |
| 6,192,985 B1 | 2/2001 | Hinkel et al. ................ 166/280 |
| 6,192,986 B1 | 2/2001 | Urlwin-Smith .............. 166/295 |
| 6,196,317 B1 | 3/2001 | Hardy ......................... 166/295 |
| 6,202,751 B1 | 3/2001 | Chatterji et al. ............. 166/276 |
| 6,209,643 B1 | 4/2001 | Nguyen et al. .............. 166/276 |
| 6,209,644 B1 | 4/2001 | Brunet ........................ 166/297 |
| 6,209,646 B1 | 4/2001 | Reddy et al. ................ 166/300 |
| 6,210,471 B1 | 4/2001 | Craig ....................... 106/31.08 |
| 6,214,773 B1 | 4/2001 | Harris et al. ................ 507/271 |
| 6,231,644 B1 | 5/2001 | Chatterji et al. ............. 106/724 |
| 6,234,251 B1 | 5/2001 | Chatterji et al. ............. 166/295 |
| 6,238,597 B1 | 5/2001 | Yim et al. ................... 252/512 |
| 6,241,019 B1 | 6/2001 | Davidson et al. ............ 166/249 |
| 6,242,390 B1 | 6/2001 | Mitchell et al. ............. 507/211 |
| 6,244,344 B1 | 6/2001 | Chatterji et al. ............. 166/295 |
| 6,257,335 B1 | 7/2001 | Nguyen et al. .............. 166/280 |
| 6,260,622 B1 | 7/2001 | Blok et al. ................ 166/305.1 |
| 6,271,181 B1 | 8/2001 | Chatterji et al. ............. 507/219 |
| 6,274,650 B1 | 8/2001 | Cui ............................. 523/457 |
| 6,279,652 B1 | 8/2001 | Chatterji et al. ............. 166/194 |
| 6,279,656 B1 | 8/2001 | Sinclair et al. .............. 166/310 |
| 6,283,214 B1 | 9/2001 | Guinot et al. ............... 166/297 |
| 6,302,207 B1 | 10/2001 | Nguyen et al. .............. 166/276 |
| 6,306,998 B1 | 10/2001 | Kimura et al. ................. 528/12 |
| 6,311,733 B1 | 11/2001 | Todd et al. .................. 166/280 |
| 6,321,841 B1 | 11/2001 | Eoff et al. ................... 166/291 |
| 6,323,307 B1 | 11/2001 | Bigg et al. ................... 528/354 |
| 6,326,458 B1 | 12/2001 | Gruber et al. ............... 528/354 |
| 6,328,105 B1 | 12/2001 | Betzold ....................... 166/280 |
| 6,328,106 B1 | 12/2001 | Griffith et al. ............... 166/295 |
| 6,330,916 B1 | 12/2001 | Rickards et al. ............. 166/280 |
| 6,330,917 B2 | 12/2001 | Chatterji et al. ............. 166/295 |
| 6,350,309 B2 | 2/2002 | Chatterji et al. ............. 106/677 |
| 6,357,527 B1 | 3/2002 | Norman et al. .............. 166/300 |
| 6,364,018 B1 | 4/2002 | Brannon et al. .......... 166/280.2 |
| 6,364,945 B1 | 4/2002 | Chatterji et al. ............. 106/677 |
| 6,367,165 B1 | 4/2002 | Huttlin .......................... 34/582 |
| 6,367,549 B1 | 4/2002 | Chatterji et al. ............. 166/292 |
| 6,372,678 B1 | 4/2002 | Youngsman et al. ........ 504/128 |
| 6,376,571 B1 | 4/2002 | Chawla et al. ................ 522/64 |
| 6,387,986 B1 | 5/2002 | Moradi-Araghi et al. ... 523/211 |
| 6,390,195 B1 | 5/2002 | Nguyen et al. .............. 166/276 |
| 6,401,817 B1 | 6/2002 | Griffith et al. ............... 166/295 |

| | | | |
|---|---|---|---|
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengel et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,534,449 B1 | 3/2003 | Gilmour et al. | 507/203 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,778 B1 | 10/2003 | Ayoub et al. | 507/202 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,713,170 B1 | 3/2004 | Kaneko et al. | 428/323 |
| 6,725,926 B2 | 4/2004 | Nguyen et al. | 166/254.1 |
| 6,725,931 B2 | 4/2004 | Nguyen et al. | 166/280.2 |
| 6,729,404 B2 | 5/2004 | Nguyen et al. | 166/280.2 |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,764,981 B1 | 7/2004 | Eoff et al. | 507/110 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/279 |
| 6,887,834 B2 | 5/2005 | Nguyen et al. | 507/221 |
| 6,978,836 B2 | 12/2005 | Nguyen et al. | 166/295 |
| 7,063,151 B2 * | 6/2006 | Nguyen et al. | 166/280.2 |
| 7,261,156 B2 * | 8/2007 | Nguyen et al. | 166/276 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256097 A1 | 12/2004 | Byrd et al. | 166/90.1 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0034862 A1 | 2/2005 | Nguyen et al. | 166/281 |
| 2005/0045326 A1 | 3/2005 | Nguyen | 166/278 |
| 2005/0045330 A1 | 3/2005 | Nguyen et al. | 166/281 |
| 2005/0045384 A1 | 3/2005 | Nguyen | 175/72 |
| 2005/0051322 A1 | 3/2005 | Nguyen et al. | 166/281 |
| 2005/0051331 A1 | 3/2005 | Nguyen et al. | 166/280.2 |
| 2005/0059555 A1 | 3/2005 | Dusterhoft et al. | 507/100 |
| 2005/0061509 A1 | 3/2005 | Nguyen | 166/307 |
| 2005/0092489 A1 | 5/2005 | Welton et al. | 166/280.2 |
| 2005/0145385 A1 | 7/2005 | Nguyen | 166/279 |
| 2005/0173116 A1 | 8/2005 | Nguyen et al. | 166/280.2 |
| 2005/0194142 A1 | 9/2005 | Nguyen | 166/280.2 |
| 2005/0197258 A1 | 9/2005 | Nguyen | 507/209 |
| 2005/0263283 A1 | 12/2005 | Nguyen | 166/281 |
| 2005/0269086 A1 | 12/2005 | Nguyen et al. | 166/281 |
| 2005/0274510 A1 | 12/2005 | Nguyen et al. | 166/250.12 |
| 2005/0274517 A1 | 12/2005 | Blauch et al. | 166/280.2 |
| 2005/0277554 A1 | 12/2005 | Blauch et al. | 507/224 |
| 2005/0284637 A1 | 12/2005 | Stegent et al. | 166/308.1 |

FOREIGN PATENT DOCUMENTS

| | | |
|---|---|---|
| EP | 0313243 B1 | 10/1988 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 8/1999 |
| EP | 1132569 A2 | 9/2001 |
| EP | 1326003 A1 | 7/2003 |
| EP | 1362978 A1 | 11/2003 |
| EP | 1394355 A1 | 3/2004 |

| | | |
|---|---|---|
| EP | 1396606 A2 | 3/2004 |
| EP | 1398460 A1 | 3/2004 |
| EP | 1403466 A2 | 3/2004 |
| EP | 1464789 A1 | 10/2004 |
| GB | 1107584 | 3/1968 |
| GB | 1264180 | 12/1969 |
| GB | 1292718 | 10/1972 |
| GB | 2382143 | 4/2001 |
| WO | 0528595 A1 | 8/1992 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 03/027431 A2 | 4/2003 |
| WO | WO 93/15127 | 8/2003 |
| WO | WO 2004/037946 A1 | 5/2004 |
| WO | WO 2004/038176 A1 | 5/2004 |
| WO | WO 2005/021928 A2 | 3/2005 |

OTHER PUBLICATIONS

U.S. Appl. No. 10/649,029, filed Aug. 27, 2003, Nguyen et al.
U.S. Appl. No. 10/727,365, filed Dec. 4, 2003, Reddy et al.
U.S. Appl. No. 10/853,879, filed May 26, 2004, Nguyen et al.
U.S. Appl. No. 10/861,829, filed Jun. 4, 2004, Stegent et al.
U.S. Appl. No. 10/868,593, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056,635, filed Feb. 11, 2005, Dusterhoft et al.
Halliburton, CoalStim℠ Service, *Helps Boost Cash Flow From CBM Assets*, Stimulation, HO03679 Oct. 2003, 2003, Halliburton Communications, 2003.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications, 2003.
Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.
Halliburton "CobraFrac℠ Service, *Coiled Tubing Fracturing—Cost-Effective Method for Stimulating Untapped Reserves*", 2 pages.
Halliburton Cobra Frac Advertisment.
Halliburton "*SurgiFrac*℠ Service, a Quick and cost-Effective Method to Help Boost Production From Openhole Horizonal Completions".
Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, 2004, Halliburton Communications.
Almond et al., *Factors Affecting Proppant Flowback With Resin Coated Proppants*, SPE 30096, pp. 171-186.
Nguyen et al., *A Novel Approach For Enhancing Proppant Consolidation: Laboratory Testing And Field Application*, SPE Paper No. 77748.

SPE 15547, *Field Application of Lignosulfonate Gels To Reduce Channeling*, South Swan Hills Miscible Unit, Alberta, Canada, by O.R. Wagner et al.
Owens et al., *Waterflood Pressure Pulsing for Fractured Reservoirs* SPE 1123.
Felsenthal et al., *Pressure Pulsing—An Improved Method of Waterflooding Fractured Reservoirs* SPE 1788.
Raza, "*Water and Gas Cyclic Pulsing Method for Improved Oil Recovery*", SPE 3005.
Peng et al., "*Pressure Pulsing Waterflooding in Dual Porosity Naturally Fractured Reservoirs*" SPE 17587.
Dusseault et al, "*Pressure Pulse Workovers in Heavy Oil*", SPE 79033.
Yang et al., "*Expermental Study on Fracture Initiation By Pressure Pulse*", SPE 63035.
Nguyen et al., *New Guidelines For Applying Curable Resin Coated Proppants*, SPE Paper No. 39582.
Kazakov et al., "*Optimizing and Managing Coiled Tubing Frac Strings*" SPE 60747.
Advances in Polymer Science, vol. 157, "*Degradable Aliphatic Polyesters*" edited by A.-C. Alberston, pp. 1-138.
Gorman, *Plastic Electric: Lining up the Future of Conducting Polymers* Science News, vol. 163.
Gidley et al., "*Recent Advances in Hydrakic Fracturing*," Chapter 6, pp. 109-130.
Simmons et al., "Poly(phenyllactide): *Synthesis, Characterization, and Hydrolytic Degradation, Biomacromolecules*", vol. 2, No. 2, pp. 658-663.
Yin et al., "*Preparation and Characterization of Substituted Polylactides*", Americal Chemical Society, vol. 32, No. 23, pp. 7711-7718.
Yin et al., "*Synthesis and Properties of Polymers Derived from Substituted Lactic Acids*", American Chemical Society, Ch. 12, pp. 147-159.
Cantu et al., "*Laboratory and Field Evaluation of a Combined Fluid-Loss Control Additive and Gel Breaker for Fracturing Fluids,*" SPE 18211.
Love et al., "*Selectivity Placing Many Fractuers in Openhole Horizonal Wells Improves Production*", SPE 50422.
McDaniel et al. "*Envolving New Stimulation Process roves Highly Effective In Level 1 Dual-Lateral Completion*" SPE 78697.
Dechy-Cabaret et al., "*Controlled Ring-Operated Polymerization of Lactide and Glycolide*" American Chemical Society, Chemical Reviews, A-Z, AA-AD.
Funkhouser et al., "*Synthetic Polymer Fracturing Fluid For High-Temperature Applications*", SPE 80236.
Vichaibun et al., "*A New Assay for the Enzymatic Degradation of Polylactic Acid, Short Report*", ScienceAsia, vol. 29, pp. 297-300.
CDX Gas, CDX Solution, 2003, CDX, LLC, Available @ www.cdxgas.com/solution.html, printed pp. 1-2.
Halliburton brochure entitled "H2Zero™ Service Introducing The Next Generation of cost-Effective Conformance Control Solutions".
Halliburton brochure entitled INJECTROL® A Component.
Halliburton brochure entitled "INJECTROL® G Sealant".
Halliburton brochure entitled "INJECTROL® IT Sealant".
Halliburton brochure entitled "INJECTROL® Service Treatment".
Halliburton brochure entitled "INJECTROL® U Sealant".
Halliburton brochure entitled "Sanfix® A Resin".
Attia, Yosry et al., "Adsorption Thermodynamics of a Hydrophobic Polymeric Flocculant on Hydrophobic Colloidal Coal Particles", langmuir 1991, 7, pp. 2203-2207.

* cited by examiner

METHODS OF PREPARING AND USING COATED PARTICULATES

This application is a divisional of application Ser. No. 10/794,076 filed on Mar. 5, 2004 now U.S. Pat. No. 7,063,151, now pending.

BACKGROUND

The present invention involves methods of preparing coated particulates and using such coated particulates in subterranean applications such as production enhancement and sand control. More particularly, the present invention relates to methods of preparing particulates coated with tackifying agent or resin that need not be immediately used once they are prepared.

Subterranean operations often use particulates coated with tackifying agents or resins. One example of a production stimulation operation using coated particulates is hydraulic fracturing, wherein a formation is treated to increase its permeability by hydraulically fracturing the formation to create or enhance one or more cracks or "fractures." In most cases, a hydraulic fracturing treatment involves pumping a proppant-free, viscous fluid (known as a pad fluid) into a subterranean formation faster than the fluid can escape into the formation so that the pressure in the formation rises and the formation breaks, creating an artificial fracture or enlarging a natural fracture. Then a proppant is generally added to the fluid to form a slurry that is pumped into the fracture to prevent the fracture form closing when the pumping pressure is released. A portion of the proppant may be coated with a tackifying agent, inter alia, to control fines from migrating into the proppant pack. A portion of the proppant may also be coated with curable resin so that, once cured, the placed proppant forms a consolidated mass and prevents the proppant from flowing back during production of the well.

An example of a well completion operation using a treating fluid containing coated particulates is gravel packing. Gravel packing treatments are used, inter alia, to reduce the migration of unconsolidated formation particulates into the well bore. In gravel packing operations, particles known in the art as gravel are carried to a well bore by a hydrocarbon or water carrier fluid. That is, the particulates are suspended in a carrier fluid, which may be viscosified, and the carrier fluid is pumped into a well bore in which the gravel pack is to be placed. The carrier fluid leaks off into the subterranean zone and/or is returned to the surface while the particulates are left in the zone. The resultant gravel pack acts as a filter to separate formation sands from produced fluids while permitting the produced fluids to flow into the well bore. A portion of the gravel may be coated with resin or tackifying agent, inter alia, to further help control the migration of formation fines. Typically, gravel pack operations involve placing a gravel pack screen in the well bore and packing the surrounding annulus between the screen and the well bore with gravel designed to prevent the passage of formation sands through the pack. The gravel pack screen is generally a type of filter assembly used to support and retain the gravel placed during the gravel pack operation. A wide range of sizes and screen configurations are available to suit the characteristics of a particular well bore, the production fluid, and the subterranean formation sands. When installing the gravel pack, the gravel is carried to the formation in the form of a slurry by mixing the gravel with a viscosified carrier fluid. Once the gravel is placed in the well bore, the viscosity of the carrier fluid is reduced, and it is returned to the surface. Such gravel packs may be used to stabilize the formation while causing minimal impairment to well productivity. The gravel, inter alia, acts to prevent formation sands from occluding the screen or migrating with the produced fluids, and the screen, inter alia, acts to prevent the gravel from entering the well bore.

In some situations the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

SUMMARY OF THE INVENTION

The present invention involves methods of preparing coated particulates and using such coated particulates in subterranean applications such as production enhancement and sand control. More particularly, the present invention relates to methods of preparing particulates coated with tackifying agent or resin that need not be immediately used once they are prepared.

One embodiment of the present invention provides a method of preparing coated particulates comprising the steps of coating particulates with a resin or a tackifying agent to create pre-coated particulates; and, covering the pre-coated particulates with a partitioning agent to create coated particulates.

Another embodiment of the present invention provides a method of treating a subterranean formation comprising the steps of providing coated particulates made by a method comprising the steps of substantially coating particulates with a resin or a tackifying agent to create pre-coated particulates; and, substantially covering the pre-coated particulates with a partitioning agent to create coated particulates; substantially slurrying the coated particulates in a servicing fluid to create a coated particulate slurry; and, placing the coated particulate slurry into the subterranean formation.

Another embodiment of the present invention provides a method of propping a fracture in a subterranean formation comprising the steps of providing coated particulates made by a method comprising the steps of: substantially coating particulates with a resin or a tackifying agent to create pre-coated particulates; and, substantially covering the pre-coated particulates with a partitioning agent to create coated particulates; substantially slurrying the coated particulates in a fracturing fluid to create a coated particulate slurry; and, placing the coated particulate slurry into at least one fracture in the subterranean formation.

Another embodiment of the present invention provides a method of gravel packing comprising the steps of providing coated particulates made by a method comprising the steps of substantially coating particulates with a resin or a tackifying agent to create pre-coated particulates; and, substantially covering the pre-coated particulates with a partitioning agent to create coated particulates; substantially slurrying the coated particulates in a gravel packing fluid to create a coated particulates slurry; introducing the coated particulates slurry to a well bore such that the coated particulates form a gravel pack substantially adjacent to the well bore.

The features and advantages of the present invention will be readily apparent to those skilled in the art upon a reading of the description of preferred embodiments that follows.

DESCRIPTION OF PREFERRED EMBODIMENTS

The present invention involves methods of preparing coated particulates and using such coated particulates in subterranean applications such as production enhancement and sand control. More particularly, the present invention relates to methods of preparing particulates coated with tackifying agent or resin that need not be immediately used once they are prepared. By coating a partitioning agent onto particulates that have been coated with a tackifying agent or curable resin, the methods of the present invention are capable of temporarily diminishing the "tackiness" of the treated particulates, thus preventing or minimizing the agglomeration of the particulates and the spreading of the tackifying agent or curable resin onto equipment surfaces.

Some embodiments of the present invention describe methods of creating coated particulates that may be created and then stored and or shipped before use without excessive agglomeration. Particulates coated with tackifying agents and/or resins have a tendency to agglomerate and form masses of joined particulates rather than retaining their individual character. In the methods of the present invention, particulates are coated with a tackifying agent and/or resin and then the particulates are covered with a partitioning agent to help the particulates retain their individual tacky or curable character. In some embodiments of the present invention, the coated particulates may be created a few hours or a few weeks before they are used.

Particulates suitable for use in the present invention may be comprised of any material suitable for use in subterranean operations, including graded sand, bauxite, ceramic materials, glass materials, metal beads or balls, nut hulls, polymer beads, and the like. The particulate size generally may range from about 2 to about 400 on the U.S. Sieve Series, however, it is to be understood that in certain circumstances other sizes may be desired and will be entirely suitable for practice of the present invention. In some embodiments of the present invention, the particulate is graded sand having a particle size in the range of from about 10 to about 70 mesh, U.S. Sieve Series. It is within the ability of one skilled in the art, with the benefit of this disclosure, to select a suitable particulate composition and size.

Resins suitable for use in the present invention include, but are not limited to, two-component epoxy-based resins, furan-based resins, phenolic-based resins, high-temperature (HT) epoxy-based resins, and phenol/phenol formaldehyde/furfuryl alcohol resins. Selection of a suitable resin coating material may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin also may be suitable.

One resin coating material suitable for use in the proppant compositions of the present invention is a two-component epoxy based resin comprising a hardenable resin component and a hardening agent component. The hardenable resin component is comprised of a hardenable resin and an optional solvent. The second component is the liquid hardening agent component, which is comprised of a hardening agent, a silane coupling agent, a surfactant, an optional hydrolyzable ester for, inter alia, breaking gelled fracturing fluid films on the proppant particles, and an optional liquid carrier fluid for, inter alia, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be used in the liquid hardenable resin component include, but are not limited to, organic resins such as bisphenol A-epichlorohydrin resin, polyepoxide resin, novolak resin, polyester resin, phenol-aldehyde resin, urea-aldehyde resin, furan resin, urethane resin, glycidyl ethers and mixtures thereof. In some embodiments of the present invention, the chosen resin is included in the liquid hardenable resin component in the range of from about 70% to about 100% by weight of the liquid hardenable resin component. Any solvent that is compatible with the hardenable resin and achieves the desired viscosity effect is suitable for use in the present invention. Preferred solvents are those having high flash points (most preferably about 125° F.).

Examples of the hardening agents that can be used in the liquid hardening agent component of the two-component consolidation fluids of the present invention include, but are not limited to, amines, aromatic amines, polyamines, aliphatic amines, cyclo-aliphatic amines, amides, polyamides, 2-ethyl-4-methyl imidazole and 1,1,3-trichlorotrifluoroacetone. Selection of a preferred hardening agent depends, in part, on the temperature of the formation in which the hardening agent will be used. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. The hardening agent utilized is included in the liquid hardening agent component in an amount sufficient to consolidate the coated particulates. In some embodiments of the present invention, the hardening agent used is included in the liquid hardenable resin component in the range of from about 40% to about 60% by weight of the liquid hardening agent component.

Examples of silane coupling agents that can be used in the liquid hardening agent component of the two-component consolidation fluids of the present invention include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. The silane coupling agent used is included in the liquid hardening agent component in an amount capable of sufficiently bonding the resin to the particulate. In some embodiments of the present invention, the silane coupling agent used is included in the liquid hardenable resin component in the range of from about 0.1% to about 3% by weight of the liquid hardening agent component.

Any surfactant compatible with the liquid hardening agent may be used in the present invention. Such surfactants include, but are not limited to, an ethoxylated nonyl phenol phosphate ester, mixtures of one or more cationic surfactants, and one or more non-ionic surfactants and an alkyl phosphonate surfactant. The mixtures of one or more cationic and nonionic surfactants are described in U.S. Pat. No. 6,311,773, issued to Todd et al. on Nov. 6, 2001, which is incorporated herein by reference. A $C_{12}$-$C_{22}$ alkyl phosphonate surfactant is preferred. The surfactant or surfactants used are included in the liquid hardening agent component in an amount in the range of from about 2% to about 15% by weight of the liquid hardening agent component.

Where the resin coating material of the present invention is a furan-based resin, suitable furan-based resins include, but are not limited to, furfuryl alcohol, a mixture furfuryl alcohol with an aldehyde, and a mixture of furan resin and phenolic resin. The furan-based resin may be combined with a solvent to control viscosity if desired. Suitable solvents for use in the furan-based consolidation fluids of the present invention include, but are not limited to 2-butoxy ethanol, butyl acetate, and furfuryl acetate.

Where the resin coating material of the present invention is a phenolic-based resin, suitable phenolic-based resins include, but are not limited to, terpolymers of phenol, phenolic formaldehyde resins, and a mixture of phenolic and furan resins. Of these, a mixture of phenolic and furan resins is preferred. The phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol.

Where the resin coating material of the present invention is a HT epoxy-based resin, suitable HT epoxy-based components included, but are not limited to, bisphenol A-epichlorohydrin resin, polyepoxide resin, novolac resin, polyester resin, glycidyl ethers and mixtures thereof. The HT epoxy-based resin may be combined with a solvent to control viscosity if desired. Suitable solvents for use with the HT epoxy-based resins of the present invention are those solvents capable of substantially dissolving the HT epoxy-resin chosen for use in the consolidation fluid. Such solvents include, but are not limited to, dimethyl sulfoxide and dimethyl formamide. A cosolvent such as dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters, may also be used in combination with the solvent.

Yet another resin suitable for use in the methods of the present invention is a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In the phenol/phenol formaldehyde/furfuryl alcohol resins suitable for use in the methods of the present invention, suitable silane coupling agents include, but are not limited to, n-2-(aminoethyl)-3-aminopropyltrimethoxysilane, 3-glycidoxypropyltrimethoxysilane, and n-beta-(aminoethyl)-gamma-aminopropyl trimethoxysilane. Suitable surfactants include, but are not limited to, an ethoxylated nonyl phenol phosphate ester, mixtures of one or more cationic surfactants and one or more non-ionic surfactants, and an alkyl phosphonate surfactant.

Compositions suitable for use as tackifying agents in the present invention comprise any compound that, when in liquid form or in a solvent solution, will form a non-hardening coating upon a particulate. A particularly preferred group of tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Other suitable tackifying agents are described in U.S. Pat. No. 5,853,048 issued to Weaver, et al. and U.S. Pat. No. 5,833,000 issued to Weaver, et al., the relevant disclosures of which are herein incorporated by reference.

Tackifying agents suitable for use in the present invention may be either used such that they form non-hardening coating or they may be combined with a multifunctional material capable of reacting with the tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be admixed with the tackifying compound in an amount of from about 0.01 to about 50 percent by weight of the tackifying compound to effect formation of the reaction product. In some preferably embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference.

Partitioning agents suitable for use in the present invention are those substances that will dissipate once the particulates are introduced to a servicing fluid, such as a fracturing or gravel packing fluid. Moreover, partitioning agents suitable for use in the present invention should not interfere with the tackifying agent or resin pre-coated onto the particulate when it is used, and should not interfere with the servicing fluid. In preferred embodiments, the partitioning agent is coated onto the tackifying agent pre-coated or resin pre-coated particulate in an amount of from about 1% to about 20% by weight of the pre-coated particulate. In preferred embodiments, substantially the entire surface of the tackifying agent or resin coating is pre-coated with partitioning agent.

Partitioning agents suitable for use in the present invention are those materials that are capable of coating onto the resin or tackifying agent pre-coating the particulate and reducing the sticky character. Suitable partitioning agents may be substances that will quickly dissipate in the presence of the servicing fluid. Examples of suitable partitioning agents that will dissolve quickly in an aqueous servicing fluid include salts (such as rock salt, fine salt, KCl, and other solid salts known in the art), barium sulfate, benzoic acid, polyvinyl alcohol, sodium carbonate, sodium bicarbonate, and mixtures thereof. Examples of suitable partitioning agents that will dissolve in an oil-based servicing fluid include wax, gilsonite, sulfonated asphalt, naphthalenesulfonate, oil soluble resins including, but not limited to, styrene-isoprene copolymers, hydrogenated styrene-isoprene block copolymers, styrene ethylene/propylene block copolymers, styrene isobutylene copolymers, styrene-butadiene copolymers, polybutylene, polystyrene, polyethylenepropylene copolymers, and combinations of two or more thereof.

The partitioning agent also may be a substance that dissipates more slowly in the presence of the servicing fluid. Partitioning agents that dissolve more slowly allow the operator more time to place the coated particulates. Examples of suitable partitioning agents that will dissolve more slowly in an aqueous servicing fluid include calcium oxide, degradable polymers, such as polysaccharides; chitins; chitosans; proteins; aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); poly(ethylene oxides); and poly(phosphazenes); and mixtures thereof. Examples of suitable partitioning agents that will dissolve more slowly in an oil-based servicing fluid include wax, gilsonite, sulfonated asphalt, oil soluble resins, and mixtures thereof.

The coated particulates of the present invention may be suspended in any servicing fluid known in the art, including aqueous gels, foams, emulsions, and viscosified surfactant fluids. Suitable aqueous gels are generally comprised of water and one or more gelling agents. The emulsions may be comprised of two or more immiscible liquids such as an aqueous gelled liquid and a liquefied, normally gaseous fluid, such as nitrogen. The preferred servicing fluids for use in accordance with this invention are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked servicing fluid, inter alia, reduces fluid loss and allows the fracturing fluid to transport significant quantities of suspended particulates. The servicing fluids also may include one or more of a variety of well-known additives such as breakers, stabilizers, fluid loss control additives, clay stabilizers, bactericides, and the like.

Some embodiments of the methods of the present invention provide methods for creating coated particulates comprising the steps of pre-coating particulates with a resin or a tackifying agent to create pre-coated particulates and then covering the pre-coated particulates with a partitioning agent to create coated particulates.

Other embodiments of the present invention provide a methods of treating a subterranean formation comprising the steps of providing coated particulates made by a method comprising the steps of substantially coating particulates with a resin or a tackifying agent to create pre-coated particulates; and, substantially covering the pre-coated particulates with a partitioning agent to create coated particulates; substantially slurrying the coated particulates in a servicing fluid to create a coated particulate slurry; and, placing the coated particulate slurry into the subterranean formation.

Other embodiments of the present invention provide methods of treating a subterranean formation comprising the steps of providing coated particulates made by a method comprising the steps of substantially coating particulates with a resin or a tackifying agent to create pre-coated particulates; and, substantially covering the pre-coated particulates with a partitioning agent to create coated particulates; substantially slurrying the coated particulates in a servicing fluid to create a coated particulate slurry; and, placing the coated particulate slurry into the subterranean formation.

Still other embodiments of the present invention provide methods of installing a gravel pack in a well bore comprising the steps of providing pre-coated particulates created by coating particulates with a resin or a tackifying agent to create pre-coated particulates and then covering the pre-coated particulates with a partitioning agent to create coated particulates and then substantially slurrying the pre-coated particulates in a gravel packing fluid to create a coated particulate slurry, and introducing the coated particulate slurry to the well bore such that the coated particulates form a gravel pack substantially adjacent to a well bore. The coating of partitioning agent on the pre-coated proppant is to temporarily diminish its tackiness, so that the effect of forming clusters or aggregates of proppant particulates is minimized. Large proppant clusters or aggregates tend to settle quickly and potentially cause bridging or premature screenout during gravel packing. In addition, large clusters or aggregates of proppant may also cause erosion of filtercake that has been placed for controlling fluid leak off during gravel placement of gravel pack operation.

To facilitate a better understanding of the present invention, the following examples of some of the preferred embodiments are given. In no way should such examples be read to limit the scope of the invention.

EXAMPLES

Example 1

A sample of bauxite particulates was pre-coated with a high temperature epoxy resin and another sample was pre-coated with a furan resin; each sample contained 7.8 cc of resin per 250 grams of particulate. Sodium bicarbonate powder (20 grams) was then covered onto each of the resin coated samples to form coated particulates. The samples of particulates were stored at room temperature for three days. After that time the samples, still substantially non-agglomerated, were mixed in an aqueous-based fracturing fluid and formed, a slurry concentration of 7 pounds of particulates per gallon of fracturing fluid. The sodium bicarbonate covering dissolved as the particulates were mixed into the fracturing fluid. The coated particulates of the present invention proved capable of retaining their individual character even after being stored for a period of time.

The slurry was then crosslinked, stirred for an hour at 180° F., and then packed into a brass chamber and cured for at least 8 hours at 325° F. Core samples obtained from the cured particulates reflected consolidation strength of between 850 and 1,100 psi. Thus, the covering used to create the coated particulates did not act to impair consolidation.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of preparing coated particulates comprising the steps of:
    substantially coating particulates with a resin or a tackifying agent to create pre-coated particulates; and,
    substantially coating the pre-coated particulates with a partitioning agent that comprises a material that dissipates in the presence of a fluid to create coated particulates.

2. The method of claim 1 wherein the resin comprises at least one resin selected from the group consisting of: a two-component epoxy-based resin, a furan-based resin, a phenolic-based resin, a high-temperature (HT) epoxy-based resin, a phenol/phenol formaldehyde/furfuryl alcohol resin, and a combination thereof.

3. The method of claim 2 wherein the two-component epoxy-based resin comprises a hardenable resin component and a hardening agent component.

4. The method of claim 3 wherein the two-component epoxy-based resin further comprises at least one hardening agent component selected from the group consisting of: a hydrolyzable ester, a silane coupling agent, a surfactant, and a combination thereof.

5. The method of claim 2 wherein the furan-based resin comprises at least one furan-based resin selected from the group consisting of: furfuryl alcohol, a mixture of furfuryl alcohol with an aldehyde, and a mixture of a furan resin and a phenolic resin.

6. The method of claim 2 wherein the phenolic-based resin comprises at least one phenolic-based resin selected from the group consisting of: a terpolymer of phenol, a phenolic formaldehyde resin and a mixture of a phenolic resin and a furan resin.

7. The method of claim 2 wherein the HT epoxy-based resin comprises at least one HT epoxy-based resin component selected from the group consisting of: a bisphenol A-epichlorohydrin resin, a polyepoxide resin, a novolac resin, a polyester resin, a glycidyl ether, and a mixture thereof.

8. The method of claim 2 wherein the phenol/phenol formaldehyde/furfuryl alcohol resin comprises from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant.

9. The method of claim 1 wherein the tackifying agent comprises at least one tackifying agent selected from the group consisting of: a polyamide, a polyester, a polycarbonate, a polycarbamate, a natural resin, and a combination thereof.

10. The method of claim 9 wherein the tackifying agent further comprises a multifunctional material.

11. The method of claim 10 wherein the multifunctional material comprises at least one multifunctional material selected from the group consisting of: an aldehyde; a dialdehyde; a hemiacetal; an aldehyde releasing compound; a diacid halide; a dihalide; a polyacid anhydride; an epoxide; furfuraldehyde, a glutaraldehyde or aldehyde condensate; and a combination thereof.

12. The method of claim 1 wherein the partitioning agent comprises material that dissipates in the presence of an aqueous fluid.

13. The method of claim 12 wherein the partitioning agent comprises at least one partitioning agent selected from the group consisting of: a salt, barium sulfate, benzoic acid, polyvinyl alcohol, sodium carbonate, sodium bicarbonate, and a combination thereof.

14. The method of claim 12 wherein the partitioning agent comprises at least one partitioning agent selected from the group consisting of: calcium oxide, a degradable polymer, a poly(glycolide); a poly($\epsilon$-caprolactone); a poly(hydroxybutyrate); a poly(anhydride); an aliphatic polycarbonate; a poly(orthoester); a poly(amino acid); a poly(ethylene oxide); a poly(phosphazene); and a combination thereof.

15. The method of claim 1 wherein the partitioning agent comprises material that dissipates in the presence of an oliginous fluid.

16. The method of claim 15 wherein the partitioning agent comprises at least one partitioning agent selected from the group consisting of: a wax, gilsonite, sulfonated asphalt, naphthalenesulfonate, an oil-soluble resin, a styrene-isoprene copolymer, a hydrogenated styrene-isoprene block copolymer, a styrene ethylene/propylene block copolymer, a styrene isobutylene copolymer, a styrene-butadiene copolymer, polybutylene, polystyrene, a polyethylene-propylene copolymer, and a combination thereof.

17. A method of gravel packing comprising the steps of:
    providing coated particulates made by a method comprising the steps of:
        substantially coating particulates with a resin or a tackifying agent to create pre-coated particulates; and,
        substantially coating the pre-coated particulates with a partitioning agent that comprises a material that dissipates in the presence of a fluid to create coated particulates;
    substantially slurrying the coated particulates in a gravel packing fluid to create a coated particulate slurry;
    introducing the coated particulate slurry to a well bore such that the coated particulates form a gravel pack substantially adjacent to the well bore.

18. The method of claim 17 wherein the resin comprises at least one resin selected from the group consisting of: a two-component epoxy-based resin, a furan-based resin, a phenolic-based resin, a high-temperature (HT) epoxy-based resin, a phenol/phenol formaldehyde/furfuryl alcohol resin, and a combination thereof.

19. The method of claim 17 wherein the tackifying agent comprises at least one tackifying agent selected from the group consisting of: a polyamide, a polyester, a polycarbonate, a polycarbamate, a natural resin, and a combination thereof.

20. The method of claim 19 wherein the partitioning agent comprises at least one partitioning agent selected from the group consisting of: a wax, gilsonite, sulfonated asphalt, naphthalenesulfonate, an oil-soluble resin, a styrene-isoprene copolymer, a hydrogenated styrene-isoprene block copolymer, a styrene ethylene/propylene block copolymer, a styrene isobutylene copolymer, a styrene-butadiene copolymer, polybutylene, polystyrene, a polyethylene-propylene copolymer, and a combination thereof.

* * * * *